(12) United States Patent
Kahn

(10) Patent No.: US 7,975,161 B2
(45) Date of Patent: *Jul. 5, 2011

(54) REDUCING CPU AND BUS POWER WHEN RUNNING IN POWER-SAVE MODES

(75) Inventor: Opher Kahn, Zichron Yacov (IL)

(73) Assignee: Intel Corporation, Santa Clara, CA (US)

( * ) Notice: Subject to any disclaimer, the term of this patent is extended or adjusted under 35 U.S.C. 154(b) by 703 days.

This patent is subject to a terminal disclaimer.

(21) Appl. No.: 11/906,473

(22) Filed: Oct. 2, 2007

(65) Prior Publication Data

US 2008/0034247 A1 Feb. 7, 2008

Related U.S. Application Data

(63) Continuation of application No. 10/394,256, filed on Mar. 24, 2003, now Pat. No. 7,290,161.

(51) Int. Cl.
*G06F 1/06* (2006.01)
*G06F 1/08* (2006.01)
*G06F 1/04* (2006.01)
*G06F 1/12* (2006.01)

(52) U.S. Cl. ........ 713/500; 713/400; 713/401; 713/501; 713/502; 713/503; 713/600; 713/601

(58) Field of Classification Search ............ 713/400, 713/401, 500, 501, 502, 503, 600, 601
See application file for complete search history.

(56) References Cited

U.S. PATENT DOCUMENTS

| 5,021,679 A | 6/1991 | Fairbanks et al. |
| 5,153,535 A | 10/1992 | Fairbanks et al. |
| 5,307,003 A | 4/1994 | Fairbanks et al. |
| 5,404,547 A | 4/1995 | Diamantstein et al. ......... 455/73 |
| 5,537,581 A | 7/1996 | Conary et al. ................ 713/501 |
| 5,627,412 A | 5/1997 | Beard |

(Continued)

FOREIGN PATENT DOCUMENTS

JP 402280210 11/1990

OTHER PUBLICATIONS

International Search Report from PCT/US2004/003352, mailed on Oct. 11, 2004.

(Continued)

*Primary Examiner* — Thomas Lee
*Assistant Examiner* — Fahmida Rahman
(74) *Attorney, Agent, or Firm* — Trop, Pruner & Hu, P.C.

(57) ABSTRACT

A processing system includes a bus and a processor whose core is constrained to have one or more core clock signal frequencies no lower than a predetermined multiple of the lowest of one or more bus clock signal frequencies. In a power-save mode, the processor is able to generate one or more core clock signals at frequencies such that the lowest core clock signal frequency is lower than the predetermined multiple of the lowest of the one or more bus clock signal frequencies in performance mode. The processor is able to achieve this by generating the one or more bus clock signals so that the lowest of the bus clock signal frequencies in power-save mode is lower than the lowest of the bus clock signal frequencies in performance mode.

15 Claims, 4 Drawing Sheets

U.S. PATENT DOCUMENTS

| | | | |
|---|---|---|---|
| 5,752,011 A | 5/1998 | Thomas et al. | |
| 5,925,133 A * | 7/1999 | Buxton et al. | 713/323 |
| 5,974,557 A | 10/1999 | Thomas et al. | |
| 6,209,052 B1 | 3/2001 | Chin et al. | 710/109 |
| 6,216,235 B1 | 4/2001 | Thomas et al. | |
| 6,487,668 B2 | 11/2002 | Thomas et al. | |
| 6,567,876 B1 | 5/2003 | Stufflebeam | 710/303 |
| 6,785,829 B1 | 8/2004 | George et al. | 713/320 |
| 6,845,462 B2 * | 1/2005 | Yatsuda et al. | 713/501 |
| 7,007,187 B1 | 2/2006 | Wilcox et al. | 713/500 |
| 2002/0073351 A1 | 6/2002 | Oh | 713/500 |
| 2002/0104029 A1 | 8/2002 | Fang | |
| 2002/0116650 A1 | 8/2002 | Halepete et al. | 713/300 |
| 2002/0180502 A1 * | 12/2002 | Aoki et al. | 327/165 |
| 2003/0056132 A1 | 3/2003 | Yatsuda et al. | |

OTHER PUBLICATIONS

Chinese Office Action dated Nov. 16, 2007 with English Language Translation.

* cited by examiner

REDUCING CPU AND BUS POWER WHEN RUNNING IN POWER-SAVE MODES

This application is a continuation of U.S. patent application Ser. No. 10/394,256, now U.S. Pat. No. 7,290,161, filed Mar. 24, 2003 entitled "REDUCING CPU AND BUS POWER WHEN RUNNING IN POWER-SAVE MODES," the content of which is hereby incorporated by reference.

BACKGROUND

An apparatus containing a processor may have different modes of operation, the different modes representing a different trade-off between power consumption and performance.

In one exemplary mode of operation ("performance" mode), internal resources of the apparatus, including the processor, may be operated for high performance that may result in high power consumption.

In another exemplary mode of operation ("power-save" mode), internal resources of the apparatus, including the processor, may be operated for low power consumption while maintaining a predetermined performance for this mode of operation.

A processor may comprise a core constrained to have a lowest of core clock signal frequencies no lower than a predetermined multiple of a lowest of bus clock signal frequencies of a bus coupled to the processor. As higher bus clock signal frequencies become possible, this raises the lower limit to which the core clock signal frequencies can be reduced in power-save mode, thus hampering the efforts to reduce power consumption in power-save mode.

It would be beneficial to reduce power consumption while the apparatus operates in power-save mode, while maintaining or improving the performance.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
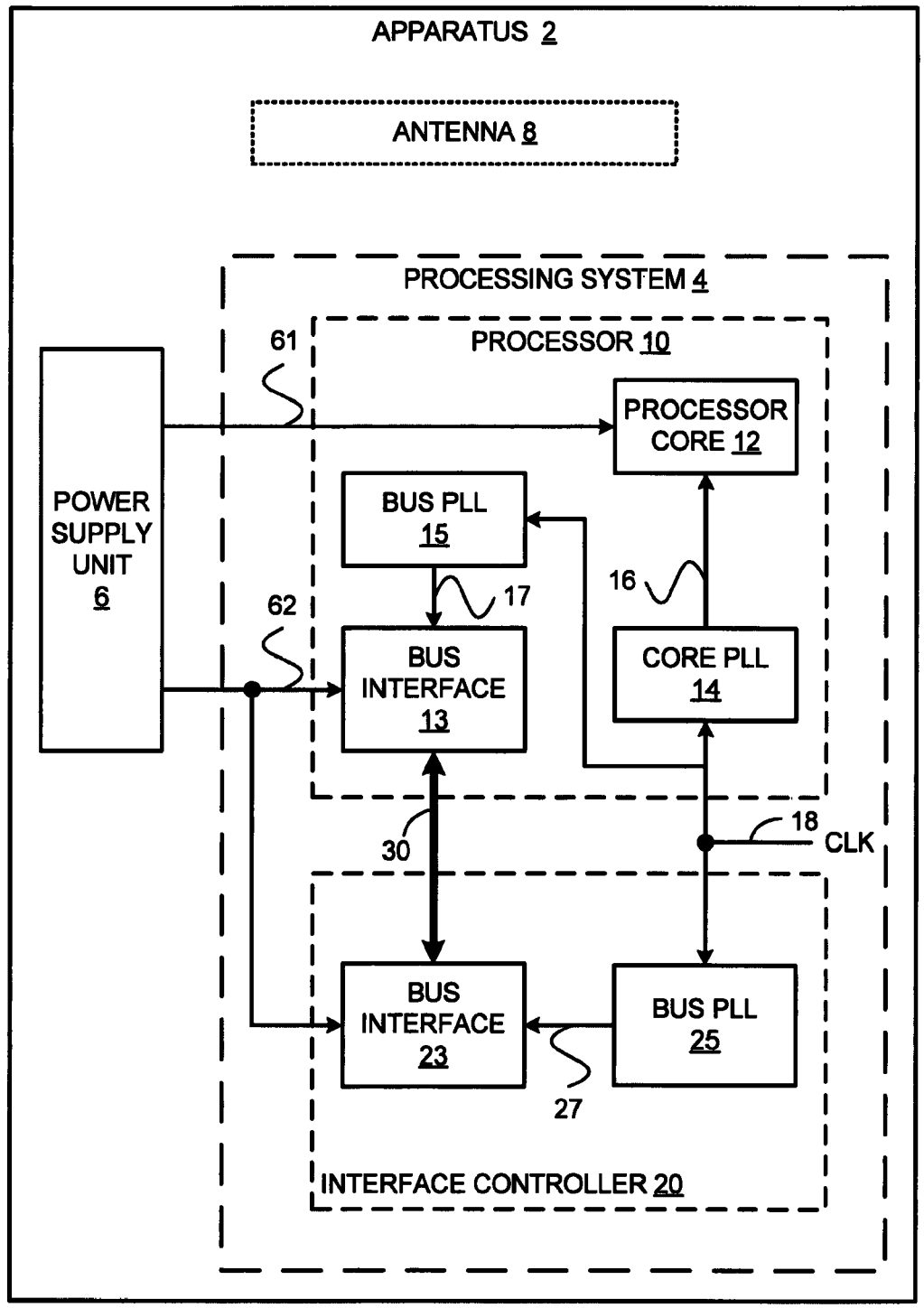
FIG. 1 is a simplified block diagram of an apparatus comprising a processing system in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

It should be understood that embodiments of the present invention may be used in any apparatus having a processor. Although the present invention is not limited in this respect, the apparatus may be a portable device that may be powered by a battery. Non-limiting examples of such portable devices include laptop and notebook computers, mobile telephones, personal digital assistants (PDA), and the like. Alternatively, the apparatus may be a non-portable device, such as, for example, a desktop computer.

As shown in FIG. 1, according to some embodiments of the present invention, an apparatus 2 may comprise a processing system 4 and a power supply unit 6. Apparatus 2 may optionally comprise an antenna 8. Well-known components and circuits of apparatus 2 and processing system 4 are not shown in FIG. 1 so as not to obscure the invention.

Processing system 4 may comprise a processor 10 and an interface controller 20. Although the present invention is not limited in this respect, processor 10 may be, for example, a central processing unit (CPU), a digital signal processor (DSP), a reduced instruction set computer (RISC), a complex instruction set computer (CISC) and the like. Moreover, processor 10 may be part of an application specific integrated circuit (ASIC). Although the present invention is not limited in this respect, interface controller 20 may be, for example, a bus bridge, a peripheral component interconnect (PCI) north bridge, a PCI south bridge, an accelerated graphics port (AGP) bridge, a memory interface device and the like, or a combination thereof. Moreover, interface controller 20 may be part of an application specific integrated circuit (ASIC) or part of a chip set.

Processor 10 may comprise a core 12 and a core phase locked loop (PLL) 14. Core PLL 14 may generate one or more core clock signals 16 used by core 12 from a system clock signal 18.

Processor 10 and interface controller 20 may comprise a bus interface 13 and a bus interface 23, respectively, and may use them to generate and sample data, address and control signals of a bus 30.

Processor 10 and interface controller 20 may comprise a bus PLL 15 and a bus PLL 25, respectively. Bus PLL 15 and bus PLL 25 may use system clock signal 18 to generate clock signals 17 and clock signals 27, respectively. Bus interface 13 and bus interface 23 may use clock signals 17 and 27, respectively, to generate and sample data, address and control signals of bus 30.

Since they are derived from system clock signal 18, clock signals 16, 17 and 27 may maintain fixed phase relations with system clock signal 18, and consequently with one another. Moreover, the phase relations between clock signals 16, 17, and 27 may be used to generate and sample data, address and control signals of bus 30.

It will be appreciated by persons of ordinary skill in the art that the performance of processing system 4 may be related to the performance of processor 10, which may be related to the performance of core 12, which may be related to the frequencies of core clock signals 16. The performance of processing system 4 may also be related to the frequencies at which data, address and control signals of bus 30 are generated and sampled. Consequently, in a performance mode of operation, it may be desired to have clock signals 16, 17 and 27 oscillating at high frequencies.

In contrast, in a power-save mode of operation, it may be desired to have core clock signals 16 oscillating at low frequencies so the power consumption of core 12 of processor 10 is lower than in the performance mode of operation, while still supporting a predetermined performance of processing system 4 for this mode of operation.

However, due to design constraints, the frequencies of core clock signals 16 may be constrained to be at least a predetermined multiple of the lowest frequency of clock signals 17. For example, core clock signals 16 may be constrained to oscillate at least six times the lowest frequency of clock signals 17, although the present invention is not limited in this respect. If clock signals 17 were to oscillate at the same frequencies both in performance mode and in power-save mode, then in power-save mode, core clock signals 16 would be constrained to oscillate at frequencies that may lead core 12 to produce higher performance (and higher power-consumption) than necessary to support the predetermined performance of processing system 4 for power-save mode.

Therefore, in order to enable core clock signals 16 to oscillate at low frequencies, clock signals 17 (and hence clock signals 27) may be generated at even lower frequencies, if that is possible while still supporting the predetermined performance of processing system 4 for power-save mode. If the frequencies of clock signals 17 and 27 are reduced relative to the frequencies that they have in performance mode, this may reduce the power consumption associated with bus interface 13, bus interface 23 and bus 30 relative to that in the performance mode of operation.

For example, in one embodiment of the present invention, system clock signal 18 may oscillate at a lower frequency in power-save mode than in performance mode. Since clock signals 16, 17 and 27 are derived from system clock signal 18, they may scale with system clock signal 18. For example, system clock signal 18 may oscillate at 200 MHz in performance mode and at 100 MHz in power-save mode. The lowest frequency of clock signal 17 may be 200 MHz in performance mode and 100 MHz in power-save mode, enabling core clock signals 16 to oscillate at as low as 600 MHz in power-save mode, using an example where the core clock signals are constrained to oscillate at frequencies no lower than six times the lowest frequency of the bus clock signals. However, in this embodiment, as processing system 4 changes from one mode to another, there may be a period of time until core PLL 14 and bus PLLs 15 and 25 relock onto the new frequency of system clock signal 18, and therefore bus 30 will be idle during this time. For example, during the relock time, processor 10 may not be able to respond to interrupts and snoops. This may limit the occasions where a switch between performance mode and power-save mode may be performed. Although the present invention is not limited in this respect, in some cases the relock time of PLLs 14, 15 and 25 may be approximately 5 to 30 microseconds.

In other embodiments of the present invention, described herein below with respect to FIG. 2, the frequency of system clock signal 18 does not vary between performance mode and power-save mode.

Power supply unit 6 may provide power to core 12 via a power trace 61. Moreover, power supply unit 6 may provide power to bus interface 13 and to bus interface 23 via a power trace 62.

It will be appreciated by persons of ordinary skill in the art that the power consumption associated with core 12 of processor 10 increases as the voltage on power trace 61 increases, and the power consumption associated with bus interface 13, bus 30 and bus interface 23 increases as the voltage on power trace 62 increases. Consequently, it may be desired to lower the voltage on power traces 61 and 62 when apparatus 2 is in the power-save mode of operation. In order to enable lowering the voltage on power trace 62, bus interface 13 and bus interface 23 may be designed to use a low voltage level for a low frequency mode, such as, for example, the power-save mode, and a higher voltage level for a high frequency mode, such as, for example, the performance mode. It will be appreciated by persons of ordinary skill in the art that the lower the frequencies of core clock signals 16, the lower power supply unit 6 may reduce the voltage on power trace 61. Similarly, the lower the frequencies of clock signals 17 and 27, the lower power supply unit 6 may reduce the voltage on power trace 62.

It will also be appreciated by persons of ordinary skill in the art that frequency changes in clock signals involve some stabilization time. Therefore, when processor 10 changes the frequency of clock signals 17 and core clock signals 16 and instructs interface controller 20 to change the frequency of clock signals 27, there may be a period of time where the frequencies and phases of clock signals 16, 17 and 27 are not synchronized and therefore are inadequate for the operation of bus 30. Although the present invention is not limited in this respect, this period of time may be a few system clock signals, equivalent in some exemplary processors to approximately 10-40 nanoseconds. Consequently, it will be desirable to have a handshake between processor 10 and interface controller 20 when changing the frequency of clock signals 16, 17 and 27.

For example, processor 10 may send a signal to interface controller 20 to indicate a change from performance mode to power-save mode. This signal may be a new sideband signal from processor 10 to interface controller 20. Alternatively, an existing signal from interface controller 20 to processor 10 may be made bi-directional to support the functionality of processor 10 indicating a mode change to interface controller 20. Moreover, both processor 10 and interface controller 20 may refrain from using bus 30 for a predefined period of time following this indication to allow both processor 10 and interface controller 20 to complete internal changes and to be ready to accept and send transactions in the new mode.

Figure 2:
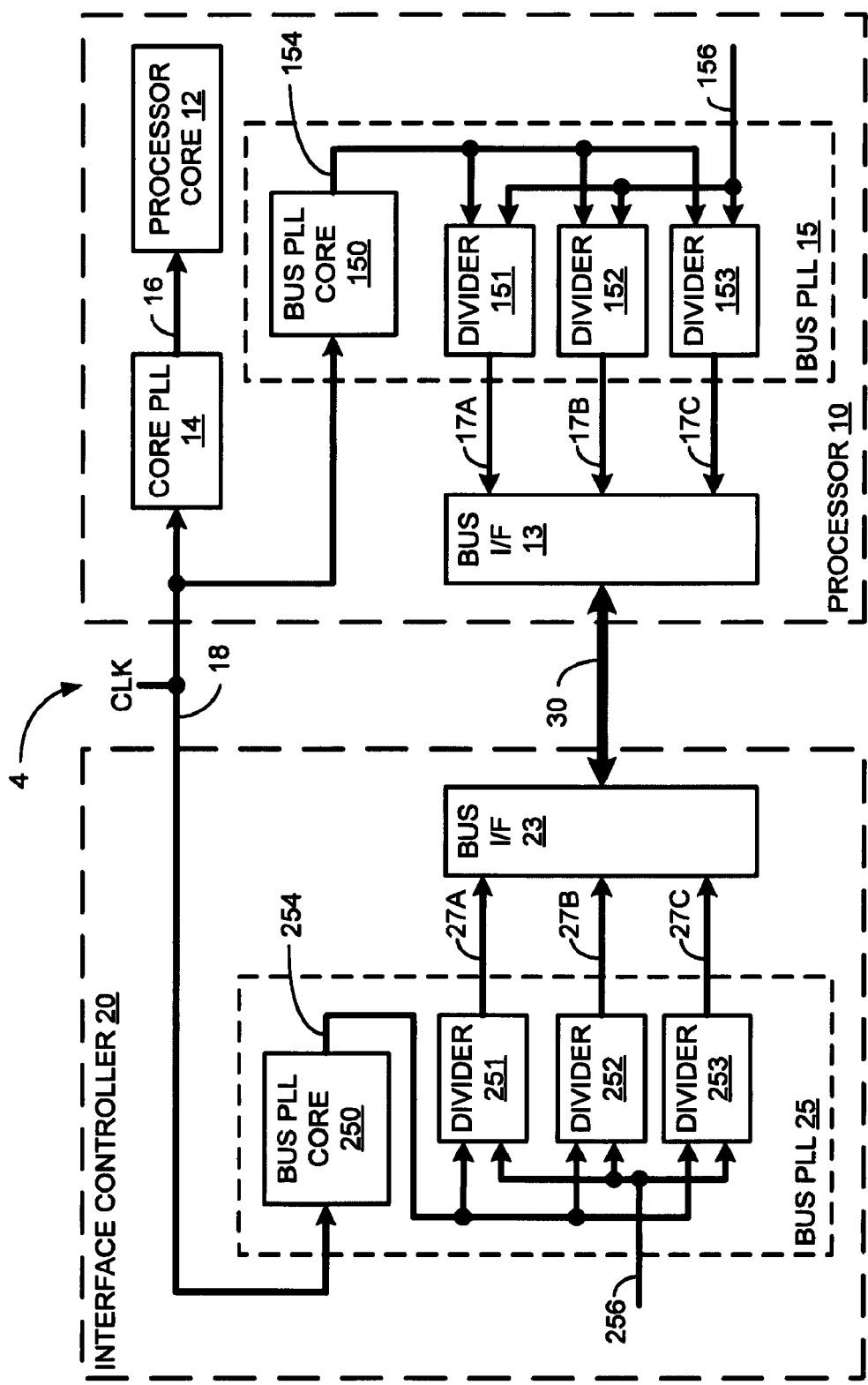
FIG. 2 is a simplified block-diagram illustration of a processing system, in accordance with some embodiments of the present invention.

FIG. 2 is a simplified block-diagram illustration of processing system 4, in accordance with some embodiments of the present invention.

Clock signals 17 of processor 10 may comprise clock signal 17A, clock signal 17B and clock signal 17C, which may be used, for example, by bus interface 13 to generate and sample control, address and data signals, respectively, over bus 30.

Similarly, clock signals 27 of interface controller 20 may comprise clock signal 27A, clock signal 27B and clock signal 27C, which may be used, for example, by bus interface 23 to generate and sample control, address and data signals, respectively, over bus 30.

Clock signals 17A, 17B and 17C may have fixed frequency relations with one another. For example, clock signal 17C may oscillate at twice the frequency of clock signal 17B, and clock signal 17B may oscillate at twice the frequency of clock signal 17A. Moreover, clock signals 17A, 17B and 17C may maintain fixed phase relations with one another.

Similarly, clock signals 27A, 27B and 27C may have fixed frequency relations with one another. For example, clock signal 27C may oscillate at twice the frequency of clock signal 27B, and clock signal 27B may oscillate at twice the frequency of clock signal 27A. Moreover, clock signals 27A, 27B and 27C may maintain fixed phase relations with one another.

Bus PLL 15 of processor 10 may comprise a bus PLL core 150 and frequency dividers 151, 152 and 153. Bus PLL core 150 may receive system clock signal 18 as an input and may generate a clock signal 154, which may maintain fixed phase relations with system clock signal 18 and with core clock signals 16. Clock signal 154 may oscillate at the same frequency in performance mode and in power-save mode, so that bus PLL core 150 may remain locked to system clock signal 18. Frequency dividers 151, 152 and 153 may receive clock signal 154 and may divide it to generate clock signal 17A, clock signal 17B and clock signal 17C, respectively. Therefore, clock signal 154, which is generated from system clock signal 18 and divided in order to generate clock signals 17A, 17B and 17C, may be considered an intermediate clock signal. Clock signal 154 may be internal to bus PLL 15, although the present invention is not limited in this respect. Clock signals 17A, 17B and 17C may maintain fixed phase relations with clock signal 154, with system clock signal 18 and with core clock signals 16.

As an example, in performance mode, clock signal 154 may oscillate at 1600 MHz, and frequency dividers 151, 152 and 153 may divide clock signal 154 by eight, four and two, respectively, so that clock signals 17A, 17B and 17C oscillate at frequencies of 200 MHz, 400 MHz and 800 MHz, respectively. Core clock signals 16 may oscillate at 300 MHz, which is more than six times the frequency of clock signal 17A.

It may be possible for core 12 to support the predetermined performance of processing system 4 in power-save mode when core clock signals 16 oscillate at 600 MHz, and for bus interface 13, bus 30 and bus interface 23 to support the predetermined performance of processing system 4 in power-save mode when clock signal 17A oscillates at 100 MHz.

Therefore, in power-save mode, clock signal 154 may still oscillate at 1600 MHz, and frequency dividers 151, 152 and 153 may divide clock signal 154 by sixteen, eight and four, respectively, so that clock signals 17A, 17B and 17C oscillate at frequencies of 100 MHz, 200 MHz and 400 MHz, respectively. Core clock signals 16 may then oscillate at frequencies as low as 600 MHz, while still satisfying the constraint that the frequencies of core clock signals 16 are at least six times the frequency of clock signal 17A.

A frequency control signal 156 of processor 10 may be coupled to frequency dividers 151, 152 and 153, and may be used to change their frequency division between eight, four and two, respectively, in performance mode, and sixteen, eight and four, respectively, in power-save mode. Although the present invention is not limited in this respect, the idle time in which the digital frequency dividers are changed may be approximately 2-8 clock cycles of system clock signal 18, equivalent in some exemplary processors to approximately 1-20 nanoseconds.

Although the present invention is not limited in this respect, in the exemplary processing system of FIG. 2, the frequencies of clock signal 27A, clock signal 27B and clock signal 27C may match the frequencies of clock signal 17A, clock signal 17B and clock signal 17C, respectively, both in the performance mode and in the power-save mode.

Bus PLL 25 of interface controller 20 may comprise a bus PLL core 250 and frequency dividers 251, 252 and 253. Bus PLL core 250 may receive system clock signal 18 as an input and may generate a clock signal 254, which may maintain fixed phase relations with system clock signal 18. Clock signal 254 may oscillate at the same frequency in performance mode and in power-save mode, so that bus PLL core 250 may remain locked to system clock signal 18. Frequency dividers 251, 252 and 253 may receive clock signal 254 and may divide it to generate clock signal 27A, clock signal 27B and clock signal 27C, respectively. Therefore, clock signal 254, which is generated from system clock signal 18 and divided in order to generate clock signals 27A, 27B and 27C, may be considered an intermediate clock signal. Clock signal 254 may be internal to bus PLL 25, although the present invention is not limited in this respect. Clock signals 27A, 27B and 27C may maintain fixed phase relations with clock signal 254, with system clock signal 18 and with clock signals 17A, 17B and 17C of processor 10.

In performance mode, clock signal 254 may oscillate at 1600 MHz, and frequency dividers 251, 252 and 253 may divide clock signal 254 by eight, four and two, respectively, so that clock signal 27A, clock signal 27B and clock signal 27C oscillate at frequencies of 200 MHz, 400 MHz and 800 MHz, respectively.

In power-save mode, clock signal 254 may still oscillate at 1600 MHz, and frequency dividers 251, 252 and 253 may divide clock signal 254 by sixteen, eight and four, respectively, so that clock signal 27A, clock signal 27B and clock signal 27C oscillate at frequencies of 100 MHz, 200 MHz and 400 MHz, respectively.

A frequency control signal 256 of interface controller 20 may be connected to frequency dividers 251, 252 and 253, and may be used to change their frequency division between eight, four and two, respectively in performance mode, and sixteen, eight and four respectively in power-save mode.

In an alternate embodiment of the present invention, in both performance mode and power-save mode, frequency dividers 151, 152 and 153 may divide clock signal 154 by eight, four and two, respectively, so that when clock signal 154 oscillates at 1600 MHz, clock signal 17A, clock signal 17B and clock signal 17C oscillate at frequencies of 200 MHz, 400 MHz and 800 MHz, respectively. There is no need for frequency control signal 156 in this alternate embodiment. Rather, in power-save mode, bus interface 13 may further divide clock signal 17A, clock signal 17B and clock signal 17C to produce clock signals oscillating at frequencies of 100 MHz, 200 MHz and 400 MHz, respectively. Alternatively, bus interface 13 may use masking logic to decide which edges of clock signals 17A, 17B and 17C to use, based on the mode, to produce clock signals oscillating at frequencies of 100 MHz, 200 MHz and 400 MHz in power-save mode.

In this alternate embodiment, in both performance mode and power-save mode, frequency dividers 251, 252 and 253 may divide clock signal 254 by eight, four and two, respectively, so that when clock signal 254 oscillates at 1600 MHz, clock signal 27A, clock signal 27B and clock signal 27C oscillate at frequencies of 200 MHz, 400 MHz and 800 MHz, respectively. There is no need for frequency control signal 256 in this alternate embodiment. Rather, in power-save mode, bus interface 23 may further divide clock signal 27A, clock signal 27B and clock signal 27C to produce clock signals oscillating at frequencies of 100 MHz, 200 MHz and 400 MHz, respectively. Alternatively, bus interface 23 may use masking logic to decide which edges of clock signals 27A, 27B and 27C to use, based on the mode, to produce clock signals oscillating at frequencies of 100 MHz, 200 MHz and 400 MHz in power-save mode.

When the oscillation frequency of system clock signal 18 is less than or equal to the oscillation frequency of clock signal 17A and clock signal 27A, then there is no difficulty to synchronize clock signal 17A and clock signal 27A to have a desired fixed phase relationship with each other.

However, when the oscillation frequency of system clock signal 18 is higher than the oscillation frequency of clock signal 17A and clock signal 27A, there may be more than one way for clock signal 17A and clock signal 27A to maintain fixed phase relations with system clock signal 18. For example, system clock signal 18 may oscillate at 200 MHz, and in power-save mode, clock signal 17A and clock signal 27A may oscillate at 100 MHz. Even if clock signal 17A and clock signal 27A each maintain the same fixed phase relationship with system clock signal 18, there are four different fixed phase relationships possible between clock signal 17A and clock signal 27A, namely 0, .pi./2, pi., and 3.pi./2 radians. In order to set the fixed phase relation between clock signal 17A and clock signal 27A to be that desired by processing system 4, processor 10 may send a signal (not shown) to interface controller 20 when changing the frequency of clock signal 17A. This signal may be part of the handshake referred to hereinabove.

Figure 3:
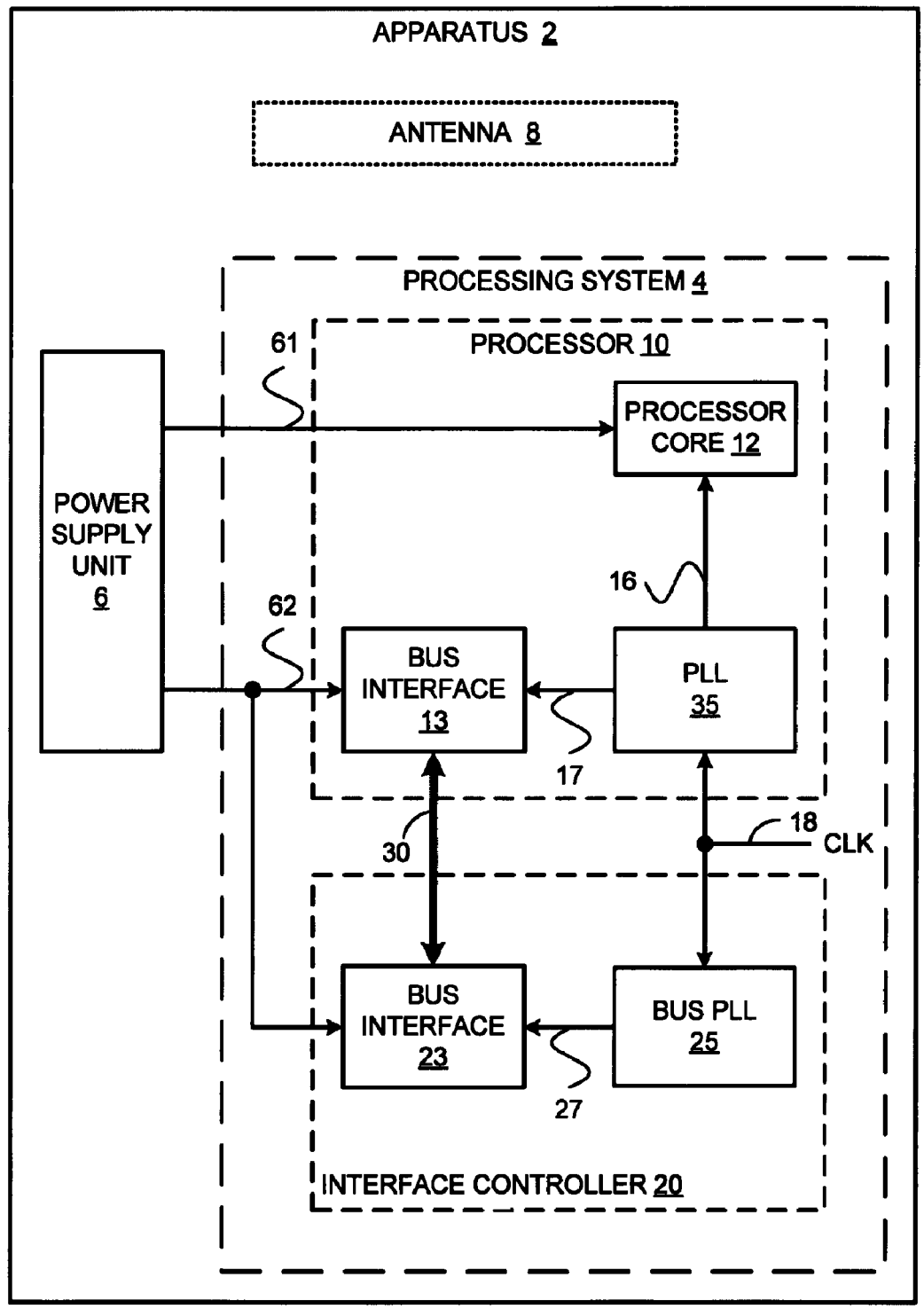
FIG. 3 is a simplified block-diagram illustration of an apparatus comprising a processing system, in accordance with other embodiments of the present invention.
Figure 4:
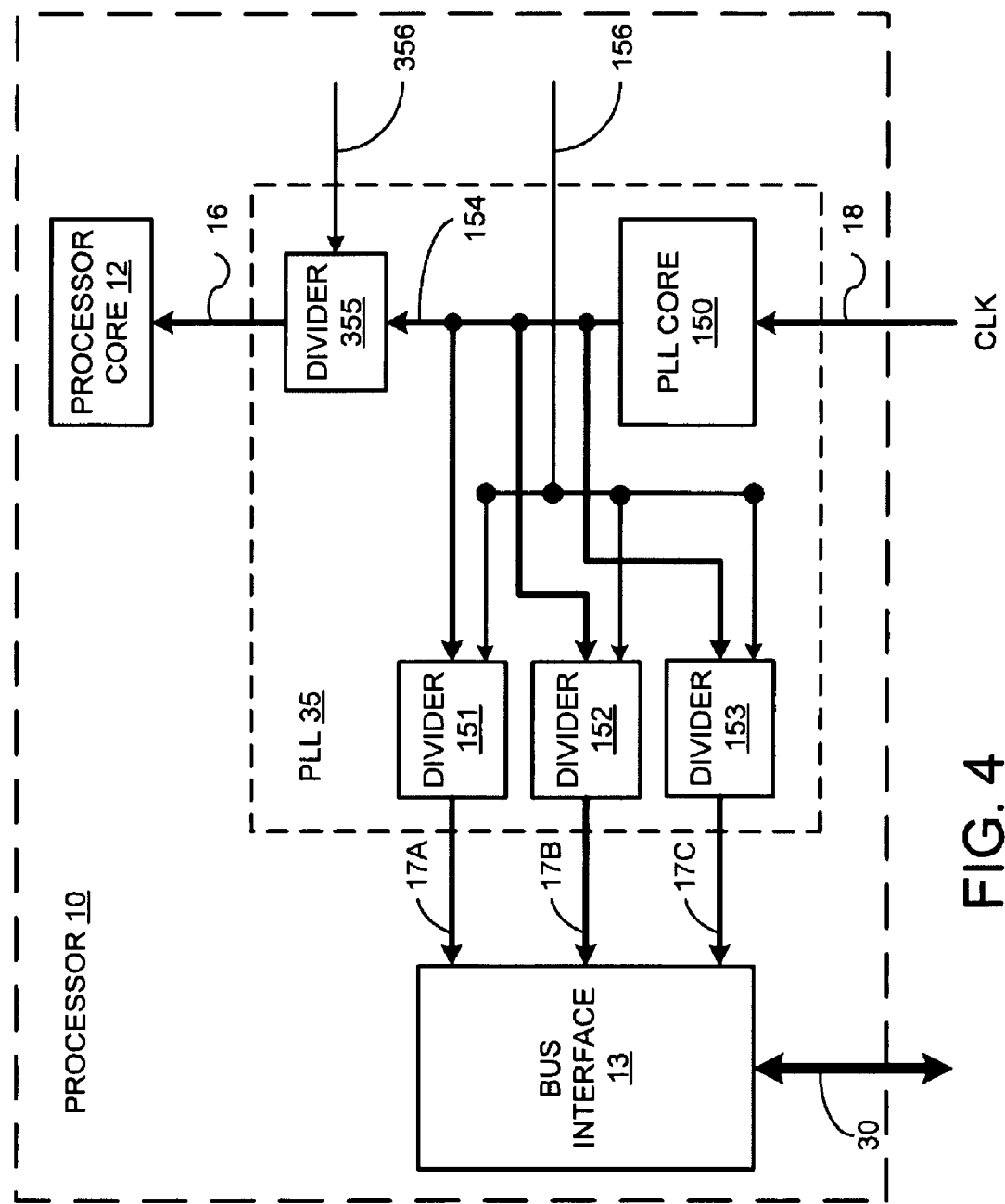
FIG. 4 is a simplified block-diagram illustration of a processor, in accordance with some embodiments of the present invention.

As shown in FIG. 3, according to some embodiments of the present invention, apparatus 2 may comprise a processing system 4 comprising a processor 10 having a PLL 35 for generating core clock signals 16 and clock signals 17 from system clock signal 18. As shown in FIG. 4, PLL 35 may comprise PLL core 150 and frequency dividers 151, 152 and 153. As with the embodiment described hereinabove with respect to FIG. 2, PLL core 150 may receive system clock signal 18 as an input and may generate clock signal 154, and frequency dividers 151, 152 and 153 may receive clock signal 154 and may divide it to generate clock signal 17A, clock signal 17B and clock signal 17C, respectively. Unlike the embodiment described hereinabove with respect to FIG. 2, PLL 35 may also comprise a frequency divider 355 to receive clock signal 154 and to divide it to generate a single core clock signal 16. If there are more than one core clock signals 16, then PLL 35 may comprise a corresponding number of frequency dividers to receive clock signal 154 and to divide it to generate core clock signals 16.

As an example, in performance mode, clock signal 154 may oscillate at 4800 MHz, and frequency divider 355 may divide it by 1, so that core clock signal 16 oscillates at 4800 MHz. Frequency dividers 151, 152 and 153 may divide clock signal 154 by twenty-four, twelve and six, respectively, so that clock signals 17A, 17B and 17C oscillate at frequencies of 200 MHz, 400 MHz and 800 MHz, respectively.

As an example, in power-save mode, clock signal 154 may still oscillate at 4800 MHz, so that PLL core 150 may remain locked to system clock signal 18, and frequency divider 355 may divide it by 8, so that core clock signal 16 oscillates at 600 MHz. Frequency dividers 151, 152 and 153 may divide clock signal 154 by forty-eight, twenty-four and twelve, respectively, so that clock signals 17A, 17B and 17C oscillate at frequencies of 100 MHz, 200 MHz and 400 MHz, respectively.

Frequency control signal 156 of processor 10 may be coupled to frequency dividers 151, 152 and 153, and may be used to change their frequency division between twenty-four, twelve and six, respectively, in performance mode, and forty-eight, twenty-four and twelve, respectively, in power-save mode. Similarly, a frequency control signal 356 of processor 10 may be coupled to frequency divider 355 to change its frequency division between 1 in performance mode and 6 in power-save mode.

In an alternate embodiment of the present invention, in both performance mode and power-save mode, frequency dividers 151, 152 and 153 may divide clock signal 154 by twenty-four, twelve and six, respectively, so that when clock signal 154 oscillates at 4800 MHz, clock signal 17A, clock signal 17B and clock signal 17C oscillate at frequencies of 200 MHz, 400 MHz and 800 MHz, respectively. There is no need for frequency control signal 156 in this alternate embodiment. Rather, in power-save mode, bus interface 13 may further divide clock signal 17A, clock signal 17B and clock signal 17C to produce clock signals oscillating at frequencies of 100 MHz, 200 MHz and 400 MHz, respectively. Alternatively, bus interface 13 may use masking logic to decide which edges of clock signals 17A, 17B and 17C to use, based on the mode, to produce clock signals oscillating at frequencies of 100 MHz, 200 MHz and 400 MHz in power-save mode.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
receiving a first clock signal having at least a first clock frequency in a processor core;
generating and sampling signals on a bus coupled to a bus interface, the bus interface coupled to the processor core, using at least a second clock signal having at least a second clock frequency, the first clock frequency constrained to be no less than a multiple of a lowest one of the second clock frequency;
dividing the second clock frequency, so as to maintain a substantially fixed ratio between the first and second clock frequencies regardless of changes in the frequency of the first clock signal or at least the second clock signal;
generating and sampling signals on the bus with an interface controller including a second bus interface, wherein the second bus interface receives a plurality of third clock signals having third clock frequencies generated from an intermediate clock signal generated from a system clock signal;
generating the at least second clock signal in a first frequency divider and changing a frequency division factor of said first frequency divider; and
changing the frequency division factor in response to a change in the first clock frequency.

2. The method of claim 1, further comprising generating the intermediate clock signal from the system clock signal in a phase locked loop, wherein a plurality of clock frequency dividers are to divide the intermediate clock signal to produce the third clock signals.

3. The method of claim 2, further comprising dividing the system clock signal in a core phase locked loop to produce the first clock signal.

4. The method of claim 1, further comprising changing the frequency division factor in response to a change in an operation mode.

5. The method of claim 1, further comprising dividing said at least one second clock frequency in at least one clock frequency divider, and wherein the signals on the bus comprise at least a control signal, an address signal, and a data signal.

6. The method of claim 5, further comprising outputting the second clock signal and the third clock signals and fourth clock signals from the bus interface to the bus each having fixed frequency and phase relationships with each other.

7. A method comprising:
operating a processor core according to a plurality of core clock frequencies, the processor core coupled to a system bus that operates according to a plurality of bus clock frequencies, wherein a substantially fixed ratio between the core clock frequencies and the bus clock frequencies is to be maintained regardless of changes in the core clock frequencies or the bus clock frequencies;

receiving a plurality of bus signals having the bus clock frequencies in a first bus interface coupled to the system bus and generating and sampling signals on the system bus using the bus signals;

dividing a second intermediate clock signal into a plurality of second bus signals in an interface controller coupled to the system bus, the interface controller including a second bus interface coupled to the system bus and having a plurality of clock dividers, and receiving the plurality of second bus signals and generating and sampling signals on the system bus using the plurality of second bus signals in the second bus interface;

producing the bus signals according to the substantially fixed ratio;

generating an intermediate clock signal from a system clock signal in a phase locked loop, and dividing the intermediate clock signal to produce the bus signals in a plurality of clock frequency dividers; and changing a frequency division factor of said plurality of clock frequency dividers in response to a change in one of the core clock frequencies, according to the substantially fixed ratio.

8. The method of claim 7, wherein the processor core is constrained to operate at the core clock frequencies that are to be no less than a multiple of a lowest frequency of the bus clock frequencies.

9. The method of claim 7, further comprising dividing the system clock signal to produce a core clock signal having one of the core clock frequencies.

10. The method of claim 7, further comprising changing the frequency division factor of said plurality of clock frequency dividers in response to a change in an operation mode, according to the substantially fixed ratio.

11. A processor comprising:

a processor core to receive a first clock signal having at least a first clock frequency from a core phase locked loop (PLL), the core PLL to generate the first clock signal from a system clock signal;

a bus PLL to receive the system clock signal and including a bus PLL core to generate an intermediate clock signal from the system clock signal, the bus PLL further including a plurality of clock frequency dividers each to divide the intermediate clock signal into a plurality of second clock signals having second clock frequencies; and a bus interface coupled to the bus PLL to generate and sample signals on a bus coupled to the bus interface, the bus interface to receive the plurality of second clock signals having the second clock frequencies, wherein the first clock frequency is constrained to be no less than a multiple of a lowest one of the second clock frequencies and a substantially fixed ratio is maintained between the first clock frequency and the second clock frequencies regardless of changes in the frequency of the first clock signal or the second clock signals.

12. The processor of claim 11, wherein the bus is further coupled to an interface controller to generate and sample signals on the bus, the interface controller including a second bus interface to receive a plurality of third clock signals having third clock frequencies and a plurality of clock frequency dividers to generate the third clock signals from a second intermediate signal generated from the system clock signal.

13. The processor of claim 11, further comprising a frequency controller to change a frequency division factor of said plurality of clock frequency dividers.

14. The processor of claim 13, wherein said frequency controller is to change the frequency division factor in response to a change in the first clock frequency.

15. The processor of claim 13, wherein said frequency controller is to change the frequency division factor in response to a change in an operation mode.

* * * * *